United States Patent [19]

Bauer et al.

[11] Patent Number: 5,215,291
[45] Date of Patent: Jun. 1, 1993

[54] GAS SPRING

[75] Inventors: Hans-Peter Bauer; Hans J. Bauer; Ludwig Stadelmann, all of Altdorf; Otmar Hein, Winkelhaid; Siegfried Keller, Nuremberg, all of Fed. Rep. of Germany

[73] Assignee: SUSPA COMPART Aktiengesellschaft, Altdorf, Fed. Rep. of Germany

[21] Appl. No.: 519,515

[22] Filed: May 3, 1990

[30] Foreign Application Priority Data

May 6, 1989 [DE] Fed. Rep. of Germany ....... 3914991

[51] Int. Cl.$^5$ .............. F16F 9/54; F16F 9/38
[52] U.S. Cl. .................. 267/120; 188/322.12; 188/322.19; 248/408; 403/328; 403/377
[58] Field of Search ............ 267/120; 188/322.11, 188/322.12, 322.19; 403/108, 328, 377; 92/51; 248/408, 409, 354.4

[56] References Cited

U.S. PATENT DOCUMENTS

| 590,997 | 10/1897 | Masseir | 403/108 |
| 713,794 | 11/1902 | Ostermann | 403/108 X |
| 1,453,650 | 5/1923 | Willson | 248/408 |
| 1,515,131 | 11/1924 | Off | 403/108 X |
| 2,980,456 | 4/1961 | McMullin | 403/108 X |
| 3,528,532 | 9/1970 | Moskow | 188/300 |
| 3,712,652 | 1/1973 | Uilkema | 403/108 |
| 3,828,694 | 8/1974 | Nestler et al. | 188/300 X |
| 4,085,763 | 4/1978 | Thomas | 248/409 X |
| 4,234,262 | 11/1980 | Nakai et al. | 403/328 X |
| 4,623,132 | 2/1985 | Smith . | |

FOREIGN PATENT DOCUMENTS

| 7535393 | 11/1976 | Fed. Rep. of Germany . | |
| 2849267 | 5/1980 | Fed. Rep. of Germany . | |
| 3225974 | 1/1984 | Fed. Rep. of Germany . | |
| 3600845 | 12/1986 | Fed. Rep. of Germany . | |
| 2849267 | 9/1987 | Fed. Rep. of Germany . | |
| 1336277 | 7/1963 | France | 248/408 |
| 19177 | of 1914 | United Kingdom | 248/408 |

Primary Examiner—George E. A. Halvosa
Attorney, Agent, or Firm—Browdy and Neimark

[57] ABSTRACT

A gas spring has a housing closed at one end and a piston rod brought out of the other end of the housing. The housing is detachably mounted in a surrounding tube and is able to be pushed into the latter as far as an end position. Securing elements are mounted respectively at the outer end of the piston rod and on the surrounding tube. So as to ensure that a part supported by the gas spring is reliably held also when the housing is partly pulled out of the surrounding tube a locking element for the detachable locking of the housing with the surrounding tube is provided in an intermediate position in which the housing respective to the end position is partly pulled out of the surrounding tube.

20 Claims, 1 Drawing Sheet

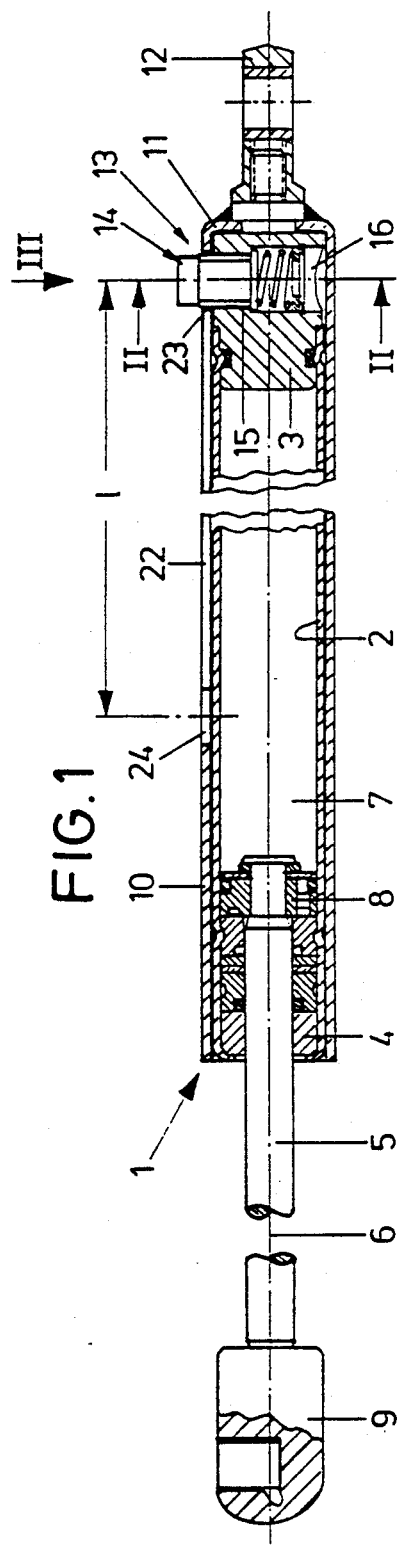
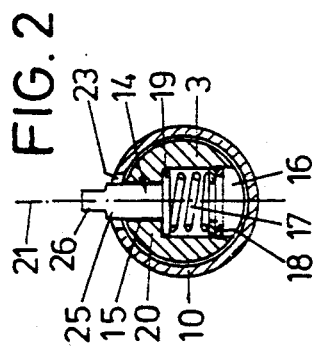
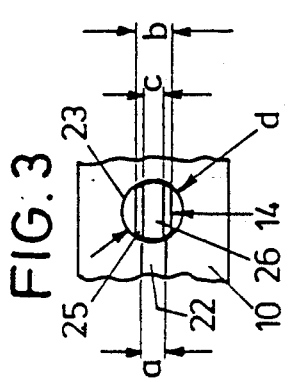
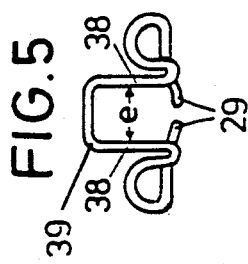
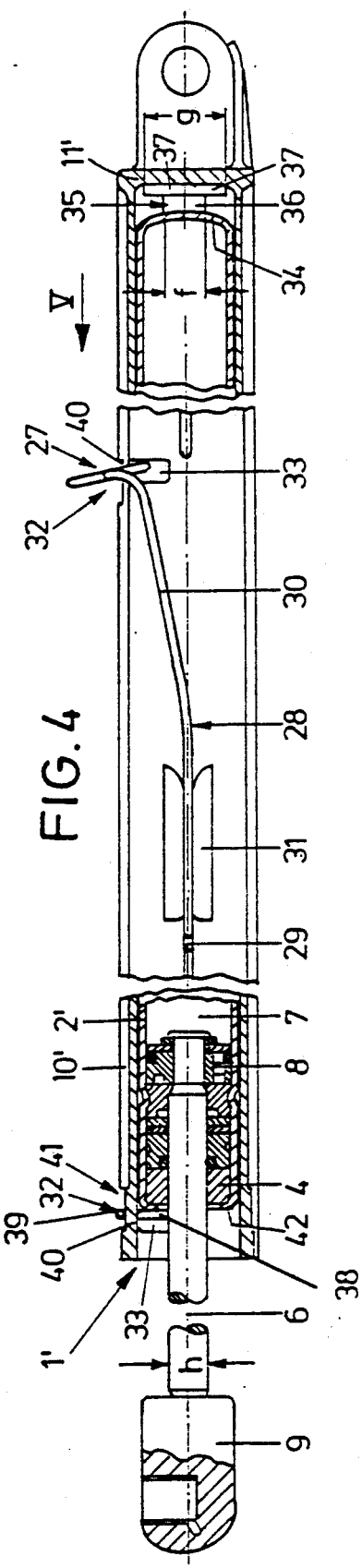

GAS SPRING

FIELD OF THE INVENTION

The invention relates to a gas spring with a housing closed at one end and a piston rod brought out of the other end of the housing, the housing being detachably mounted in a surrounding tube and being able to be pushed in the latter as far as an end position, with securing elements being mounted respectively at the outer end of the piston rod, and on the surrounding tube.

BACKGROUND OF THE INVENTION

A gas spring of this type with a surrounding tube is known from German patent 28 49 267 or published German patent application 32 25 974. The purpose of this surrounding tube is to provide an additional regulating length. This may be, for example, the case when an engine bonnet of a motor vehicle is to be movable by means of the gas spring to a central open position. On the other hand, it may be desirable for more extensive work on the engine or the like to open the bonnet beyond an open slanting position. In this instance the surrounding tube is then partly or fully pulled out from the housing of the gas spring, the bonnet being then opened beyond its top dead centre. To prevent an inadvertent pulling out of the surrounding tube from the housing of the gas spring it has in practice already become known to provide a device for locking the housing of the gas spring with the surrounding tube in the fully pushed in end position of the housing. This device consists in a spring buckle clamped externally on the surrounding tube, having a locking portion which, in this end position of the housing in the surrounding tube, as a consequence of the elastic tensioning of the spring buckle, clamps in front of the front side of the housing. To pull out the housing from the surrounding tube, the locking portion is pivoted out against the tensioning of the buckle out of the surrounding tube transversely to the central longitudinal axis of the gas spring. This known construction assumes that the part supported by the gas spring, for example, therefore, the engine bonnet, supports itself or finds itself in a stable position.

SUMMARY OF THE INVENTION

It is an object of the invention to develop a gas spring of the type first defined hereinabove in such a manner that the part supported by the gas spring can also be reliably held when the housing has been partly pulled out of the surrounding tube.

This object is achieved according to the invention in that a locking means for the detachable locking of the housing with the surrounding tube is provided in an intermediate position in which the housing respective to the end position is partly pulled out of the surrounding tube. This locking means engages automatically when the intermediate position has been reached. In this position also, therefore, the part to be supported by the gas spring, e.g. the engine bonnet or also a rear flap of a motor vehicle or any other corresponding element, can be securely held.

If, according to a first advantageous embodiment of the invention, the locking means comprises a locking bolt with a locking portion elastically mounted on the housing, which, in the intermediate position, is able to be brought by the force of a spring in engagement with a locking opening in the surrounding tube, then only pressure on the bolt will be necessary to release the locking. If the locking bolt is mounted in the region of the closed end of the housing, then the longest possible distance between the end position and the intermediate position is achievable.

If, according to a further advantageous embodiment, the bolt is designed as a guiding and locking bolt and has a guiding portion connected with the locking portion which engages in the surrounding tube when the locking portion has been pushed out of the locking opening and when the surrounding tube has been pushed relative to the housing into a guiding slot connecting with the locking opening, then it is ensured that the bolt in the intermediate position is always exactly in alignment with the locking opening. In this arrangement it is furthermore of advantage for the guiding slot to be provided at one end with a further locking opening situated at a distance from the locking opening and into which the locking portion of the bolt engages in the end position of the housing. By recourse to these measures a reliable locking in the end position is also achieved at the same time.

In a further embodiment of the invention it is advantageous if the locking means has a spring buckle clamped on the surrounding tube with a locking portion which, in the intermediate position, can be brought into engagement with a locking stop on the closed end of the housing. The locking portion is supported on the outside of the housing; therefore it must not be actuated for the housing to be able to be pushed out of the surrounding tube into the intermediate position. It must simply be again released against the force of the spring buckle when the housing is again to be pushed into the surrounding tube into the end position.

Further advantageous characteristics of the invention will be found in the following description of two embodiments of the invention based on the drawings.

BRIEF DESCRIPTION OF THE DRAWINGS

FIG. 1 is a first embodiment of a gas spring of the invention with surrounding tube in longitudinal view in partly exploded representation;

FIG. 2 is a cross-section through the gas spring with surrounding tube along sectional line II—II in FIG. 1;

FIG. 3 is a partial top view of the surrounding tube along the arrow III in FIG. 1;

FIG. 4 is a second embodiment of a gas spring of the invention with surrounding tube in longitudinal section in partly exploded representation, and FIG. 5 is a front view of a spring buckle with locking portion along arrow V in FIG. 4.

DESCRIPTION OF THE PREFERRED EMBODIMENTS

The example of embodiment of FIGS. 1 to 3 shows a gas spring 1 which has a substantially annular cylindrical housing 2. This housing 2 is sealed gas-tight at one end—the right end in FIG. 1—and in fact by means of a closing plug 3. At its other end the housing 2 has a guide bush 4, in which a piston rod 5 is slidably guided coaxially with the central longitudinal axis 6 of the housing 2. The guide bush 4 is sealed gas-tight on the one hand with respect to the housing 2 and on the other hand with respect to the piston rod 5 in the usual manner. On the end of the piston rod 5 situated in the inner space 7 of the housing a piston 8 is mounted which is designed in the usual manner as a damping piston. The inner space 7 of the housing 2 is filled with compressed gas. In addition, there is situated in it a small amount of oil which is used for lubrication between piston rod 5 and guide bush 4. In this respect we have here a standard gas spring as used on a large scale in many fields of practical use. A securing member 9 is mounted on the outer end of the piston rod 5. The housing 2 of the gas spring 1 is mounted in a surrounding tube 10 with respect to which the housing 2 has at least one sliding seating. The surrounding tube 10 is designed open on the side adjoining the piston rod 5 so that the housing 2 may be pushed in from here. At the other end the surrounding tube 10 is closed by means of a bottom 11. A securing element 12 is mounted on this bottom 11. The securing elements 9, 12 permit an incorporation of the unit consisting of the gas spring 1 and surrounding tube 10 between two parts movable relative to each other. For example, the securing element 12 may be mounted on the bonnet of a private car and the securing element 9 may be mounted in the adjoining region of the body of a private car, so that the gas spring acts as a lifting aid for raising the bonnet.

Between the gas spring 1 and the surrounding tube 10 a locking means 13 is provided for locking the housing 2 of the gas spring 1 with the surrounding tube 10 on the one hand in a position of the housing 2 fully pushed into the surrounding tube 10, and, on the other hand, in a position of the housing 2 partly pulled out of the surrounding tube 10. This locking means 13 has a guiding and locking bolt 14 which is mounted, and slidable, in a guiding channel 15 in the closing plug 3 extending perpendicularly to the axis 6. Connecting with the guiding channel 15 is a receiving chamber 16 in which a pretensioned helical compression spring 17 is mounted which, on the one hand, acts upon a stationary stop 18 in the receiving chamber 16, and on the other hand acts upon the guiding and locking bolt 14. The bolt 14 has a protruding collar 19 which applies on the edge 20 between the receiving chamber 16 and the guiding channel 15, as a result of which a pushing of the bolt 14 out of the guiding channel 15 outwards is prevented.

The bolt 14 has—as may be seen in FIGS. 1 to 3—an unround cross-section which is identical with the cross-section of the guiding channel 15; for this reason it is guided slidably but non-rotatably in the guiding channel 15, and indeed in the direction of its longitudinal axis 21.

The surrounding tube 10 has over part of its length a guide slot 22 extending parallel with the axis 6 which is closed at both ends by circular shaped locking openings 23, 24. The diameter d of these locking openings 23, 24 is greater than the width a of the guiding slot 22. The bolt 14 has transversally to the longitudinal direction of the guiding slot 22 a width b which is greater than the width a of the guiding slot 22 and smaller than the diameter d of the locking openings 23, 24. As a result of this construction the guiding and locking bolt 14, in its state pushed out as far as possible out of the closing plug 3, and as shown in FIGS. 1 to 3, protrudes into a locking opening 23. The surrounding tube 10, in this position of the bolt 14 is rigidly bolted with it and therefore with the housing 2 of the gas spring 1, as the bolt 14 is wider than the guiding slot 22, so that sliding is not possible. This portion of the bolt 14 protruding into the locking opening 23 or 24 is denoted as locking portion 25.

Connecting with the locking opening 25, from the outside inwards and therefore protruding from the surrounding tube 10, is a guiding portion 26, the width c of which transversally to the longitudinal direction of the guiding slot 22 is to some extend smaller than the width a of the guiding slot 22. When the bolt 14 is pushed in against the force of the compression spring 17 transversally to the axis 6 into the gas spring 1, the locking portion 25 is pushed out of the locking opening 23 or 24 in the direction of the axis 6, and the guiding portion 26 reaches the region of the locking opening 23 or 24. On account of the width ratios referred to the surrounding tube 10 can now be pushed relative to the housing 2 out of the gas spring 1 in the direction of the axis 6, and in fact over the length l of the centre of the distance of the locking openings 23, 24. When the bolt 14 is again released, its locking portion 25 is again pressed in a locking position into one of the two locking openings 23, 24. In this manner the housing 2, on the one hand, can be bolted in a condition fully pushed into the surrounding pipe 10, and, on the other hand, it can be bolted in partly pulled out condition with the surrounding pipe 10. If, when the housing 2 is partly pulled out of the surrounding tube 10, the bolt 14 is pushed so deeply into the closing plug 3 that the outside of the guiding portion 26 is pushed into the closing plug 3, the housing 2 can then be fully pulled out of the surrounding tube 10. Conversely, the mounting of the housing 2 in the surrounding tube 10 is effected.

As the example of embodiment of FIGS. 4 and 5 is similar in its basic construction to the example of embodiment of FIGS. 1 to 3, comparable constructional elements are given the same reference figures with a prime, without a new description being required. Insofar as the constructional elements are identical they are given identical reference figures.

On the surrounding tube 10' a locking means 27 is provided for locking the housing 2' of the gas spring 1' with the surrounding tube 10' in a condition of the housing 2' partly brought out of the latter. The locking means 27 has a spring buckle 28 which is secured by means of inwardly bent pins 29 on the surrounding tube 10' in the direction of the axis 6. The portions of the legs 30 of the spring buckle 28 adjoining the pins 29 are secured on the surrounding tube 10' in blocks 31 extending parallel with the axis 6, so that the spring buckle 28 cannot be pivoted around the pins 29 relative to the surrounding tube 10'. The locking portion 32 connecting the legs 30 at their ends facing the pins 29 can only be elastically pivoted, with corresponding elastic deformation of the portions of the legs 30 between the blocks 31 and the locking portion 32, transversally to the axis 6. In the surrounding tube 10' a transversal slot 33 is formed in which the locking portion 32 is situated. When—as shown in FIG. 4—the housing 2' of the gas spring 1' is fully pushed into the surrounding tube 10' the locking portion 32 of the spring buckle 28 applies elastically from the outside through the slot 33 against the housing 2', as the legs 30 are elastically deformed outwards out of the plane of the axis 6. The spring buckle 28 is made of elastic material, e.g., spring steel, or at least elastic steel.

The housing 2' has at its closed end a bottom 34 on which a locking stop 35, T-shaped in cross-section, is mounted. It has a short pin 36 and a protruding stop disc 37. The locking portion 32 formed on the spring buckle 28 has two webs 38 situated on one plane perpendicularly to the axis 6, the distance e between them being somewhat greater than the diameter f of the pin 36, said distance e being somewhat smaller than the diameter g of the stop disc 37. If the housing 2' of the gas spring 1' is pulled out of the surrounding tube 10' to the extent that the locking portion 32 of the spring buckle 28 covers the locking stop 35, then the locking stop 35, as a consequence of the tensioning of the legs 30, is pivoted in the direction of the axis 6. In this operation the two webs 38 grip around the pin 36, i.e. the locking portion 32 is taken up between the bottom 34 of the housing 2' and the stop disc 37 so that the gas spring, in this position partly pulled out of the surrounding tube 10', becomes locked with the latter. For releasing this locking, the locking portion 32 is again pulled manually out of the surrounding tube 10' away from the axis 6 against the spring force of the legs 30. To facilitate this, a limiting portion 39 of the locking portion 32 joining the legs 38 applies on a stop 40 of the surrounding tube 10' formed in the transversal slot 33, as a result of which the locking portion 32 is prevented from pivoting fully into the surrounding tube 10'. The locking of the housing 2' with the surrounding tube 10' in the direction of the axis 6 is thus effected, on the one hand, against the bottom 34 of the housing 2 and, on the other hand, against the stop disc 37.

Furthermore an opposite locking means 41 is provided by which the housing 2' is locked in the surrounding tube 10' in the fully pushed in state. In this state the locking stop 35 lies against the bottom 11' of the surrounding tube 10'. The surrounding tube 10' is fitted for the purpose with a spring buckle 28 with locking portion 32, identical with the spring buckle 28 with locking portion 32, but mounted in mirror symmetry with the latter. In alignment with the front side 42 of the housing 2' facing the exit of the piston rod, when the housing 2' is fully pushed into the surrounding tube 10' a transversal slot 33 with stop 40 is provided. In the bolted condition the locking portion 32 grips in front of the front side 42 of the housing 2'. As the diameter h of the piston rod is substantially equal to the diameter of the pin 36, the webs 38 are able to take up the piston rod between them. The making and releasing of the locking are effected in the same manner as already described.

What is claimed is:

1. A gas spring comprising:
   a housing having a first end and a second end and being closed at said first end;
   a piston rod brought out of said second end of said housing;
   a surrounding tube, whereby said housing is axially slidably recessed in said surrounding tube and pushable into said surrounding tube as far as an end position;
   a first securing element mounted at an outer end of said piston rod, and a second securing element mounted on the surrounding tube;
   locking means for detachably locking said housing with said surrounding tube in a first location at an intermediate position in which said housing respective to said end position is partly pulled out of said surrounding tube and in a second location where said housing is recessed within said surrounding tube,
   wherein said locking means has a locking bolt with a locking portion elastically mounted on and for movement with said housing which, in said intermediate position, is engageable by the force of a spring with a first locking opening in said surrounding tube.

2. A gas spring according to claim 1, wherein said locking bolt is provided adjacent to said first end of said housing.

3. A gas spring according to claim 1, wherein said locking bolt comprises a guiding and locking bolt having a guiding portion connected with said locking portion which, when said locking portion has been pushed out of said first locking opening and when said surrounding tube has been pushed relative to said housing, engages into a guiding slot connecting with said locking opening in said surrounding tube.

4. A gas spring according to claim 3, wherein said locking portion has a width which is greater than the width of said guiding slot.

5. A gas spring according to claim 3, wherein said guiding slot is provided at one end corresponding to said second location with a second locking opening provided at a distance from said first locking opening, and into which said locking portion of said locking and guiding bolt engages in said end position of the housing.

6. A gas spring comprising
   a housing having a first end and a second end and being closed at said first end;
   a piston rod brought out of said second end of said housing;
   a surrounding tube, whereby said housing is axially slidably recessed in said surrounding tube and pushable into said surrounding tube as far as an end position;
   a first securing element mounted at an outer end of said piston rod, and a second securing element mounted on the surrounding tube;
   locking means for detachably locking said housing with said surrounding tube in a first location at an intermediate position in which said housing respective to said end position is partly pulled out of said surrounding tube and in a second location where said housing is recessed within said surrounding tube,
   wherein said locking means comprises a spring buckle clamped on said surrounding tube with a locking portion which, in said intermediate position, is engageable with a locking stop at said first end of said housing.

7. A gas spring according to claim 6, wherein a means is provided for locking said housing in said second location with said surrounding tube in said end position of said housing in said surrounding tube, which means has a spring buckle clamped on the surrounding tube with a locking portion which, in the end position, is engageable with a front side of the housing situated at said second end of the housing.

8. A gas spring according to claim 7, wherein a transversal slot is made on said housing for the passage of said locking portion.

9. A gas spring according to claim 6, wherein a transversal slot is made in said surrounding tube for the passage of said locking portion.

10. A gas spring according to claim 6, wherein said locking portion is engageable with said front side of said housing between a stop disc of said locking stop and a bottom of said housing.

11. A gas spring comprising:
    a housing having a first end and a second end and being closed at said first end;
    a piston rod brought out of said second end of said housing;
    a surrounding tube, whereby said housing is detachably mounted in said surrounding tube and pushable into said surrounding tube as far as an end position;

a first securing element mounted at an outer end of said piston rod, and a second securing element mounted on the surrounding tube; and locking means for detachably locking said housing with said surrounding tube in an intermediate position in which said housing respective to said end position is partly pulled out of said surrounding tube, said locking means having a locking bolt with a locking portion elastically mounted on and for movement with said housing which, in said intermediate position, is engageable by the force of a spring with a locking opening in said surrounding tube.

12. A gas spring according to claim 11, wherein said locking bolt is provided adjacent to said first end of said housing.

13. A gas spring according to claim 11, wherein said locking bolt comprises a guiding and locking bolt having a guiding portion connected with said locking portion which, when said locking portion has been pushed out of said locking opening and when said surrounding tube has been pushed relative to said housing, engages into a guiding slot connecting with said locking opening in said surrounding tube.

14. A gas spring according to claim 13, wherein said guiding slot is provided at one end with a further locking opening provided at a distance from said locking opening, and into which said locking portion of said locking and guiding bolt engages in said end position of the housing.

15. A gas spring according to claim 13, wherein said locking portion has a width which is greater than the width of said guiding slot.

16. A gas spring comprising:
a housing having a first end and a second end and being closed at said first end;
a piston rod brought out of said second end of said housing;
a surrounding tube, whereby said housing is detachably mounted in said surrounding tube and pushable into said surrounding tube as far as an end position;
a first securing element mounted at an outer end of said piston rod, and a second securing element mounted on the surrounding tube; and
locking means for detachably locking said housing with said surrounding tube in an intermediate position in which said housing respective to said end position is partly pulled out of said surrounding tube, said locking means having a spring buckle clamped on said surrounding tube with a locking portion which, in said intermediate position, is engageable with a locking stop at said first end of said housing.

17. A gas spring according to claim 16, wherein a means is provided for locking said housing with said surrounding tube in said end position of said housing in said surrounding tube, which means has a spring buckle clamped on the surrounding tube with a locking portion which, in the end position, is engageable with a front side of the housing situated at said second end of the housing.

18. A gas spring according to claim 17, wherein a transversal slot is made on said housing for the passage of said locking portion.

19. A gas spring according to claim 16, wherein a transversal slot is made on said housing for the passage of said locking portion.

20. A gas spring according to claim 16, wherein said locking portion is engageable with said front side of said housing between a stop disc of said locking stop and a bottom of said housing.

* * * * *